US012288521B2

(12) United States Patent
Joo et al.

(10) Patent No.: US 12,288,521 B2
(45) Date of Patent: Apr. 29, 2025

(54) LIGHT EMITTING DISPLAY APPARATUS AND METHOD OF REPAIRING THE SAME

(71) Applicant: LG DISPLAY CO., LTD., Seoul (KR)

(72) Inventors: Eun Ji Joo, Paju-si (KR); Hyun Haeng Lee, Paju-si (KR)

(73) Assignee: LG Display Co., Ltd. (KR)

(*) Notice: Subject to any disclaimer, the term of this patent is extended or adjusted under 35 U.S.C. 154(b) by 79 days.

(21) Appl. No.: 18/206,641

(22) Filed: Jun. 7, 2023

(65) Prior Publication Data

US 2024/0005865 A1 Jan. 4, 2024

(51) Int. Cl.
*G09G 3/32* (2016.01)
*G09G 3/3241* (2016.01)

(52) U.S. Cl.
CPC ... *G09G 3/3241* (2013.01); *G09G 2300/0413* (2013.01); *G09G 2300/0426* (2013.01); *G09G 2300/043* (2013.01)

(58) Field of Classification Search
CPC ......... G09G 3/3241; G09G 2300/0413; G09G 2300/0426; G09G 2300/043
See application file for complete search history.

(56) References Cited

U.S. PATENT DOCUMENTS

| | | | | |
|---|---|---|---|---|
| 2015/0262538 A1* | 9/2015 | Kim | G09G 3/3677 345/103 |
| 2020/0226983 A1* | 7/2020 | Lee | H10K 59/1213 |
| 2020/0302841 A1* | 9/2020 | Jung | G09G 3/3275 |

* cited by examiner

*Primary Examiner* — Michael A Faragalla
(74) *Attorney, Agent, or Firm* — Fish & Richardson P.C.

(57) ABSTRACT

A light emitting display apparatus includes a plurality of subpixels provided on a substrate, a reference line arranged in a first direction on the substrate, a power line arranged in the first direction on the substrate, a scan line arranged in a second direction intersecting with the first direction on the substrate, a reference branch line connected with the reference line and arranged in the second direction, and a dummy metal layer disposed on the substrate, the dummy metal layer including a region overlapping with the scan line and a region overlapping with the reference branch line.

12 Claims, 15 Drawing Sheets

LIGHT EMITTING DISPLAY APPARATUS AND METHOD OF REPAIRING THE SAME

CROSS-REFERENCE TO RELATED APPLICATION

This application claims the priority of Korean Patent Application No. 10-2022-0079653 filed on Jun. 29, 2022, which is hereby incorporated by reference in its entirety.

BACKGROUND

Field of the Disclosure

The present disclosure relates to a light emitting display apparatus and a method of repairing the same.

Description of the Background

As information technology advances, the market for display apparatuses which are connection mediums connecting a user with information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which supplies power to the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

SUMMARY

Accordingly, the present disclosure is directed to a light emitting display apparatus and a method of repairing the same that substantially obviate one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to secure an opening region by welding a region apart from the opening region when short circuit occurs between a gate metal layer for forming a scan line and a different metal layer or the scan line is cut and may reduce or minimize the number of welding operations, thereby reducing or minimizing a time taken in a repair process.

To achieve the above and other advantages and in accordance with the present disclosure, as embodied and broadly described herein, a light emitting display apparatus includes a plurality of subpixels provided on a substrate, a reference line arranged in a first direction on the substrate, a scan line arranged in a second direction intersecting with the first direction on the substrate, a reference branch line connected with the reference line and partly arranged in the second direction, and a dummy metal layer disposed on the substrate, the dummy metal layer including a region overlapping with the scan line and a region overlapping with the reference branch line.

The dummy metal layer may be selected as a lower metal layer disposed directly on the substrate, and the scan line and the reference branch line may be selected as a gate metal layer disposed above the dummy metal layer.

The dummy metal layer may have a state electrically separated from the scan line and electrically connected to the reference branch line.

The dummy metal layer may have a state electrically connected with the scan line by a welding process.

When the dummy metal layer and the scan line have an electrically connected state, the reference line and the reference branch line may have an electrically disconnected state.

When the dummy metal layer is electrically connected with the scan line and the reference line and the reference branch line have an electrically disconnected state, the reference branch line may function as a bypass signal line transferring, through a bypass path, a scan signal applied through the scan line.

The dummy metal layer may be disposed in a region adjacent to the power line.

The scan line may be disposed in a '1'-shape (or 'I'-shape), except a region intersecting with the power line.

The reference branch line may be electrically connected with the reference line by a reference connection line arranged in the first direction, and when the reference branch line functions as the bypass signal line, the reference connection line may have a state electrically disconnected from the reference line by a line cutting process.

The reference branch line may include a first branch portion connected with a first subpixel, a second branch portion connected with a second subpixel adjacent to the first subpixel, a third branch portion connected with a third subpixel adjacent to the second subpixel, and a fourth branch portion connected with a fourth subpixel adjacent to the third subpixel.

The second branch portion and the third branch portion may be arranged in the first direction, the first branch portion may be wired to extend in a vertical direction from a center region of the second branch portion and may be wired in a horizontal direction up to a region where the first subpixel is provided, and the fourth branch portion may be wired to extend in a vertical direction from a center region of the third branch portion and may be wired in a horizontal direction up to a region where the fourth subpixel is provided.

The first and second branch portions and the third and fourth branch portions may be horizontally symmetrical with respect to the first reference line.

Each of the second branch portion and the third branch portion has a line length which is shorter than the first branch portion and the fourth branch portion.

The first branch portion and the second branch portion have a sharing margin by a first sub cutting line for performing repair in the first subpixel and a second sub cutting line for performing repair in the second subpixel, and the third branch portion and the fourth branch portion have a sharing margin by a third sub cutting line for performing repair in the third subpixel and a fourth sub cutting line for performing repair in the fourth subpixel.

In another aspect of the present disclosure, a method of repairing a light emitting display apparatus includes performing welding at a periphery of a one-side subpixel at a disconnection section of the scan line and at a periphery of an other-side subpixel apart from the one-side subpixel so that one side of the scan line is electrically connected with one side of the reference branch line and the other side of the scan line is electrically connected with the other side of the reference branch line and cutting the reference line and the reference branch line to be electrically disconnected from each other.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with example embodiments of the disclosure.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of the present disclosure, illustrate aspect(s) of the disclosure and together with the description serve to explain the principle of the disclosure.

In the drawings.

DETAILED DESCRIPTION

Figure 1:
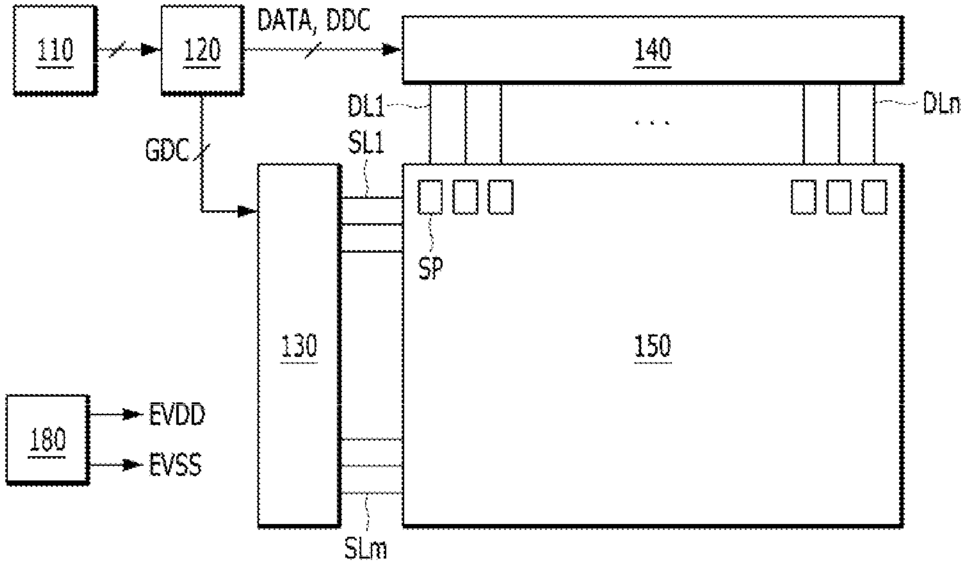
FIG. 1 is a block diagram schematically illustrating an organic electroluminescent display apparatus according to an aspect of the present disclosure.

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

The shapes, sizes, ratios, angles, numbers, and the like, which are illustrated in the drawings to describe various example embodiments of the present disclosure are merely given by way of example. Therefore, the present disclosure is not limited to the illustrations in the drawings. The same or similar elements are designated by the same reference numerals throughout the specification unless otherwise specified. In the following description where the detailed description of the relevant known function or configuration may unnecessarily obscure an important point of the present disclosure, a detailed description of such known function of configuration may be omitted.

In describing a position relationship, when a position relation between two parts is described as, for example, “on,” “cover,” “under,” or “next,” one or more other parts may be disposed between the two parts unless a more limiting term, such as “just” or “direct(ly),” is used. In describing a time relationship, when the temporal order is described as, for example, “after,” “subsequent,” “next,” or “before,” a case that is not continuous may be included unless a more limiting term, such as “just,” “immediate(ly),” or “direct(ly),” is used.

In describing elements of the present disclosure, when an element or layer is described as being “connected,” “coupled,” or “adhered” to another element or layer, the element or layer can not only be directly connected, coupled, or adhered to another that other element or layer, but also be indirectly connected, coupled, or adhered to that other another element or layer with one or more intervening elements or layers “disposed,” or “interposed” between the elements or layers, unless otherwise specified.

When “comprise,” “have,” and “include” described in the present specification are used, another part may be added unless “only” is used. An element described in a singular form is intended to include a plurality of elements, and vice versa, unless the contrary context clearly indicates otherwise.

Any implementation described herein as an “example” is not necessarily to be construed as preferred or advantageous over other implementations.

In construing an element, the element is construed as including an error or tolerance range even where is no explicit description of such an error or tolerance range.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term “part” or “unit” may apply, for example, to a separate circuit or structure, an integrated circuit, a computational block of a circuit device, or any structure configured to perform a described function as should be understood to one of ordinary skill in the art.

Hereinafter, the present disclosure will be described more fully with reference to the accompanying drawings, in which exemplary aspects of the disclosure are shown. The disclosure may, however, be embodied in many different forms and should not be construed as being limited to the aspects set forth herein; rather, these aspects are provided so that this disclosure will be thorough and complete, and will fully convey the concept of the disclosure to those skilled in the art.

A display apparatus according to the present disclosure may be applied to televisions (TVs), signal players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, for convenience of description, a light emitting display apparatus self-emitting light on the basis of an inorganic light emitting diode or an organic light emitting diode will be described for example. A light emitting display apparatus may be implemented based on an inorganic light emitting diode, or may be implemented based on an organic light emitting diode. Hereinafter, for convenience of description, an example will be described where a light emitting display apparatus is implemented based on an organic light emitting diode.

Moreover, an example where a subpixel described below includes an n-type thin film transistor (TFT) will be described, but is not limited thereto and the subpixel may be implemented with a p-type TFT or with an n-type TFT and a p-type TFT. A TFT may be a three-electrode element including a gate, a source, and a drain. The source may be an electrode which provides a carrier to a transistor. In the TFT, a carrier may start to flow from the source. The drain may be an electrode where the carrier flows from the TFT to the outside. That is, in the TFT, the carrier flows from the source to the drain.

In the n-type TFT, because a carrier is an electron, a source voltage may be lower than a drain voltage so that the electron flows from the source to the drain. In the n-type TFT, because the electron flows from the source to the drain, a current may flow from the drain to the source. On the other hand, in the p-type TFT, because a carrier is a hole, a source voltage may be higher than a drain voltage so that the hole flows from the source to the drain. In the p-type TFT, because the hole flows from the source to the drain, a current may flow from the source to the drain. However, a source and a drain of a TFT are not fixed and may switch therebetween based on a voltage applied thereto. Therefore, the disclosure is not limited due to a source and a drain of a transistor. Based thereon, in the following description, one of a source and a drain will be described as a first electrode, and the other of the source and the drain will be described as a second electrode.

Figure 2:
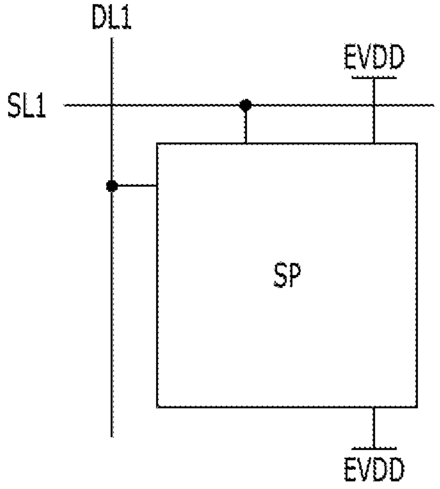
FIG. 2 is a block diagram schematically illustrating a subpixel illustrated in FIG. 1.

FIG. 1 is a block diagram schematically illustrating an organic electroluminescent display apparatus according to an aspect of the present disclosure, and FIG. 2 is a block diagram schematically illustrating a subpixel illustrated in FIG. 1.

As illustrated in FIGS. 1 and 2, the organic electroluminescent display apparatus according to an aspect of the present disclosure may include a signal supply unit 110, a timing controller 120, a scan driver 130, a data driver 140, a display panel 150, and a power supply 180. But the example embodiments of the organic electroluminescent display apparatus are not limited thereto.

The signal supply unit 110 (or a host system) may output a signal data signal supplied from the outside or a signal data signal and various driving signals stored in an internal memory thereof. The signal supply unit 110 may supply a data signal and the various driving signals to the timing controller 120. The signal supply unit 110 may be any one of various electronic devices such as a television system, a set-top box, a navigation system, a DVD player, a Blu-ray player, a personal computer (PC), a home theater system, a phone system, and the like.

The timing controller 120 may output a gate timing control signal GDC for controlling an operation timing of the scan driver 130, a data timing control signal DDC for controlling an operation timing of the data driver 140, and various synchronization signals (for example, a vertical synchronization signal Vsync and a horizontal synchronization signal Hsync). The timing controller 120 may control a display panel driving circuit including a scan driver 130 and a data driver 140 (described later) for writing data of an input image to subpixels of the organic electroluminescent display apparatus.

The timing controller 120 may provide the data driver 140 with the data timing control signal DDC and a data signal DATA supplied from the signal supply unit 110. The timing controller 120 may be implemented as an integrated circuit (IC) type and may be mounted on a printed circuit board (PCB), but is not limited thereto.

The scan driver 130 may output a scan signal (or a scan voltage) and an emission control signal in response to the gate timing control signal GDC supplied from the timing controller 120. The scan driver 130 may supply the scan signal to a plurality of subpixels, included in the display panel 150, through a plurality of scan lines SL1 to SLm (for example, gate lines) and may select the subpixel that is charged with a data voltage through the scan line SL and adjust an emission timing. The scan driver 130 may be implemented as an IC type or may be directly provided on the display panel 150 in a gate-in panel (GIP) type, but is not limited thereto.

In response to the data timing control signal DDC supplied from the timing controller 120, the data driver 140 may sample and latch the data signal DATA supplied from the timing controller 120, convert the leatched digital data signal into an analog data voltage on the basis of a gamma reference voltage, and output the converted analog data voltage.

The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate and output a first power EVDD having a high level and a second power EVSS having a low level on the basis of an external input voltage supplied from the outside. The power supply unit 180 may generate and output a voltage (for example, a scan high voltage and a scan low voltage) needed for driving of the scan driver 130 or a voltage (for example, a drain voltage and a half drain voltage) needed for driving of the data driver 140, in addition to the first power EVDD and the second power EVSS.

The display panel 150 may display an image on the basis of a driving signal, including the scan signal and a data voltage output from a driver including the scan driver 130 and the data driver 140, and the first and second powers EVDD and EVSS output from the power supply 180. The display panel 150 may display an image, based on a pixel including a plurality of subpixels SP. The pixel may include red, green, and blue subpixels, or may include red, green, blue, and white subpixels, but is not limited thereto. Other color systems such as cyan, magenta, yellow and black might be adopted.

Hereinabove, each of the timing controller 120, the scan driver 130, and the data driver 140 has been described as an individual element. However, based on an implementation type of a light emitting display apparatus, one or more of the timing controller 120, the scan driver 130, and the data driver 140 may be integrated into one IC.

Figure 3:
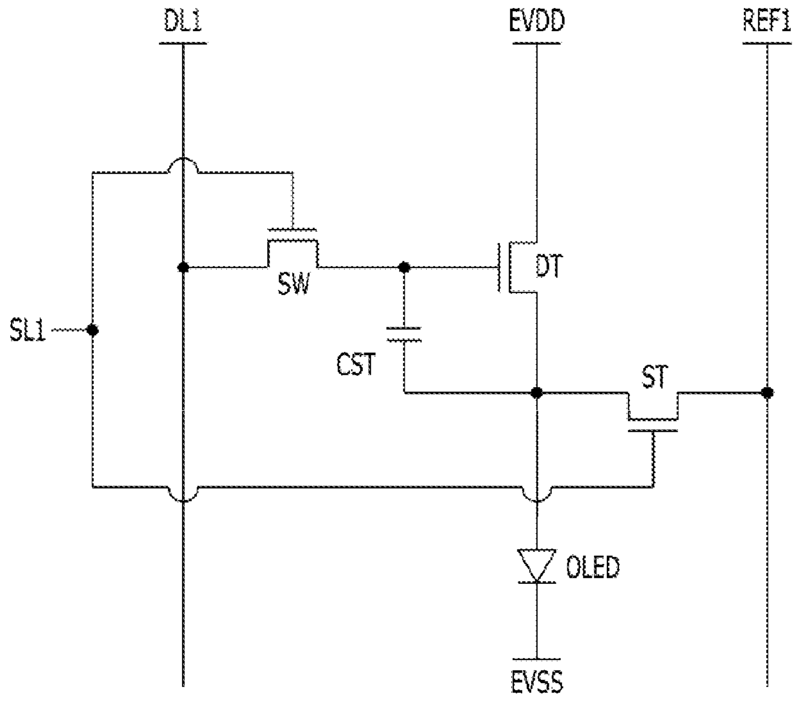
FIG. 3 is an equivalent circuit diagram illustrating a subpixel according to an aspect of the present disclosure.
Figure 4:
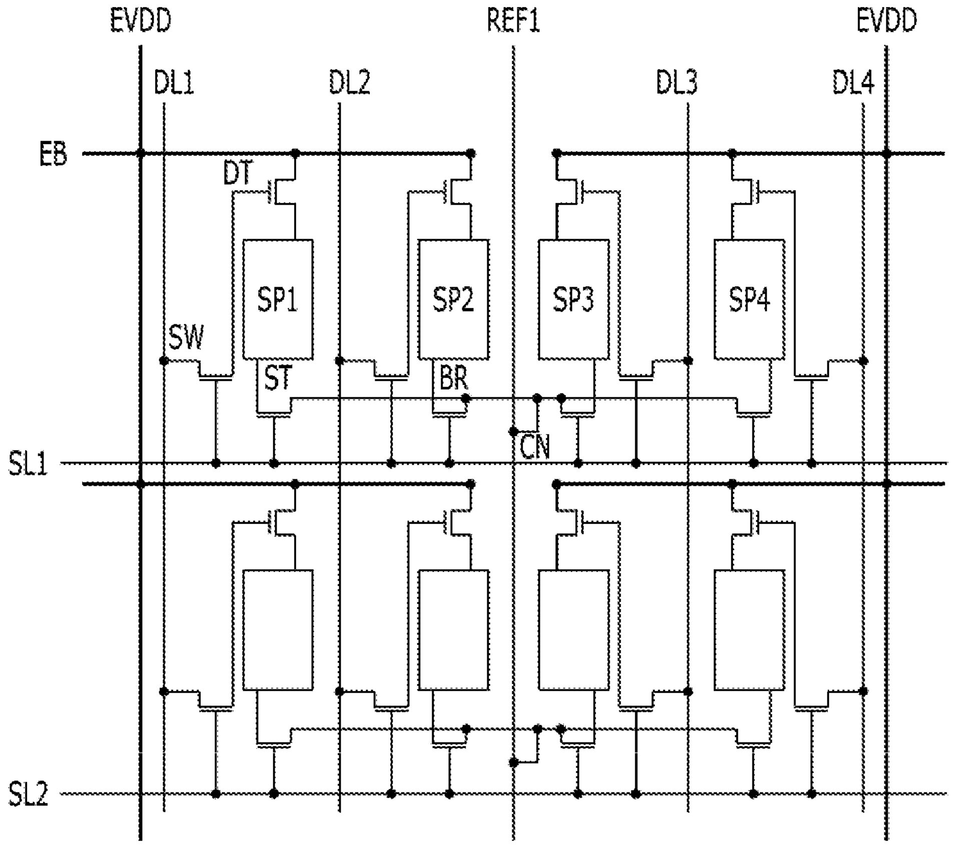
FIG. 4 is a circuit diagram schematically illustrating pixels implemented based on FIG. 3.

FIG. 3 is an equivalent circuit diagram illustrating a subpixel according to an aspect of the present disclosure, and FIG. 4 is a circuit diagram schematically illustrating pixels implemented based on FIG. 3.

As illustrated in FIG. 3, a subpixel may include a switching transistor SW, a sensing transistor ST, a driving transistor DT, a capacitor CST, and an organic light emitting diode OLED, but is not limited thereto. A subpixel may include more or less elements than above.

The driving transistor DT may include a gate electrode connected with a first electrode of the capacitor CST, a first electrode connected with a first power line EVDD, and a second electrode connected with an anode electrode of the organic light emitting diode OLED. The capacitor CST may include a first electrode connected with the gate electrode of the driving transistor DT and a second electrode connected with the anode electrode of the organic light emitting diode OLED. The organic light emitting diode OLED may include the anode electrode connected with the second electrode of the driving transistor DT and a cathode electrode connected with a second power line EVSS. The driving transistor DT may operate to flow a driving current between the first power line EVDD (e.g., high potential voltage) and the organic light emitting diode OLED in accordance with the data voltage stored in the storage capacitor Cst.

The switching transistor SW may include a gate electrode connected with a first scan line SL1, a first electrode connected with a first data line DL1, and a second electrode connected with the gate electrode of the driving transistor DT. The sensing transistor ST may include a gate electrode connected with the first scan line SL1, a first electrode connected with a first reference line REF1, and a second electrode connected with the anode electrode of the organic light emitting diode OLED. The switching thin film transistor SW may perform a switching operation to store a data signal supplied through the first data line DL1 in the storage capacitor Cst as a data voltage in response to the scan signal supplied through the first scan line SL1.

The sensing transistor ST may be a compensation circuit which is added for compensating for a degradation or a threshold voltage of each of the driving transistor DT and the organic light emitting diode OLED. The sensing transistor ST may obtain a sensing value through a sensing node defined between the driving transistor DT and the organic light emitting diode OLED. The sensing value obtained from the sensing transistor ST may be transferred to an external compensation circuit, which is provided outside the subpixel, through the first reference line REF1.

The sensing transistor ST can be turned on or off according to the sense signal supplied through first scan line SL1, which is another type of the gate line GL, and control an electrical connection between the first reference line REF1 and the drain node of the driving transistor DT.

The sensing transistor ST can be turned on by the sense signal having the turn-on level voltage, and transmit a voltage at the drain node of the driving transistor DT to the first reference line REF1.

The storage capacitor Cst may include a first electrode connected to the gate electrode of the driving transistor DT, and a second electrode connected to the drain node of the driving transistor DT. The storage capacitor Cst may be an external capacitor intentionally designed to be located outside of the driving transistor DT, other than an internal capacitor, such as a parasitic capacitor (e.g., a Cgs, a Cgd).

The anode electrode of the Organic light emitting diode OLED may be connected to the drain electrode of the driving transistor DT, and its cathode electrode may be connected to the second power EVSS.

It should be understood that the sub-pixel structures shown in FIG. 3 are merely examples of possible sub-pixel structures for convenience of discussion, and example embodiments of the present disclosure may be implemented in any of various structures, as desired. For example, the sub-pixel SP may further include at least one transistor and/or at least one capacitor.

As illustrated in FIG. 4, a pixel may include a first subpixel SP1, a second subpixel SP2, a third subpixel SP3, and a fourth subpixel SP4. The first subpixel SP1 may emit red light, the second subpixel SP2 may emit white light, the third subpixel SP3 may emit blue light, and the fourth subpixel SP4 may emit green light, but the present disclosure is not limited thereto. One or more different colors may be emitted by subpixels, including yellow-green, black, etc, A first electrode of a switching transistor SW included in the first subpixel SP1 may be connected with the first data line DL1, a first electrode of a switching transistor SW included in the second subpixel SP2 may be connected with a second data line DL2, a first electrode of a switching transistor SW included in the third subpixel SP3 may be connected with a third data line DL3, and a first electrode of a switching transistor SW included in the fourth subpixel SP4 may be connected with a fourth data line DL4. Connections of the first subpixel SP1, the second subpixel SP2, the third subpixel SP3, and the fourth subpixel SP4 are not limited thereto. For example, a first electrode of a switching transistor SW included in the first subpixel SP1 may be connected with a second data line DL2, a first electrode of a switching transistor SW included in the second subpixel SP2 may be connected with a first data line DL1, a first electrode of a switching transistor SW included in the third subpixel SP3 may be connected with a fourth data line DL4, and a first electrode of a switching transistor SW included in the fourth subpixel SP4 may be connected with a third data line DL3.

First electrodes of driving transistors DT respectively included in the first subpixel SP1, the second subpixel SP2, the third subpixel SP3, and the fourth subpixel SP4 may be connected with the first power line EVDD in common. To provide a more detailed description, the first electrodes of driving transistors DT respectively included in the first subpixel SP1, the second subpixel SP2, the third subpixel SP3, and the fourth subpixel SP4 may be connected with a first power branch line EB of the first power line EVDD in common. Alternatively, first electrodes of the sensing transistors ST respectively included in the first subpixel SP1, the second subpixel SP2, the third subpixel SP3, and the fourth subpixel SP4 may be connected with different power branch lines of the first power line EVDD, respectively.

Gate electrodes of sensing transistors ST and the switching transistors SW respectively included in the first subpixel SP1, the second subpixel SP2, the third subpixel SP3, and the fourth subpixel SP4 may be connected with the first scan line SL1 in common. A second scan line SL2 may be disposed in a line next to the first scan line SL1. Alternatively, the second scan line SL2 may be disposed to be spaced apart from the first scan line SL1.

First electrodes of the sensing transistors ST respectively included in the first subpixel SP1, the second subpixel SP2, the third subpixel SP3, and the fourth subpixel SP4 may be connected with the first reference line REF1 in common. To provide a more detailed description, first electrodes of the sensing transistors ST respectively included in the first subpixel SP1, the second subpixel SP2, the third subpixel SP3, and the fourth subpixel SP4 may be connected with a first reference branch line BR of the first reference line REF1 in common. Alternatively, first electrodes of the sensing transistors ST respectively included in the first subpixel SP1, the second subpixel SP2, the third subpixel SP3, and the fourth subpixel SP4 may be connected with different reference branch lines of the first reference line REF1, respectively. The first reference line REF1 may be disposed between the third data line DL3 and the second data line DL2. The first reference line REF1 may be electrically connected with the first reference branch line BR by a first reference connection line CN, but is not limited thereto, and the first reference line REF1 may be disposed between other data lines.

Figure 5:
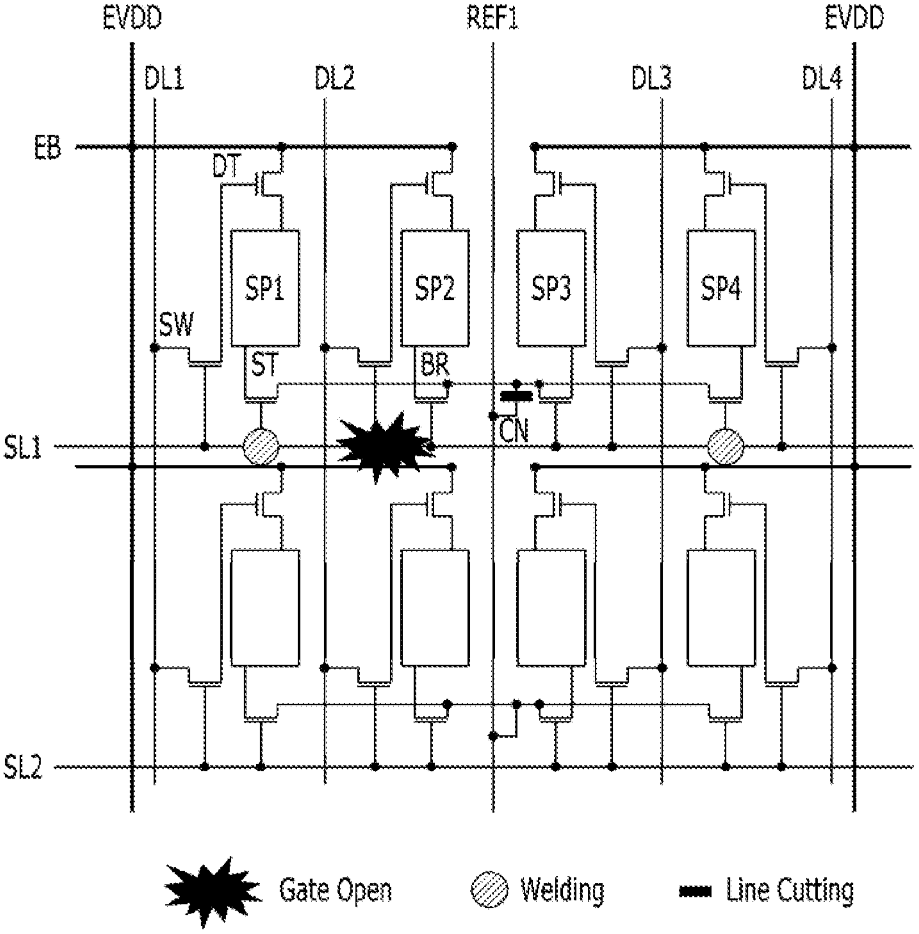
FIG. 5 is a circuit diagram for schematically describing a repair structure and method according to an aspect of the present disclosure.
Figure 6:
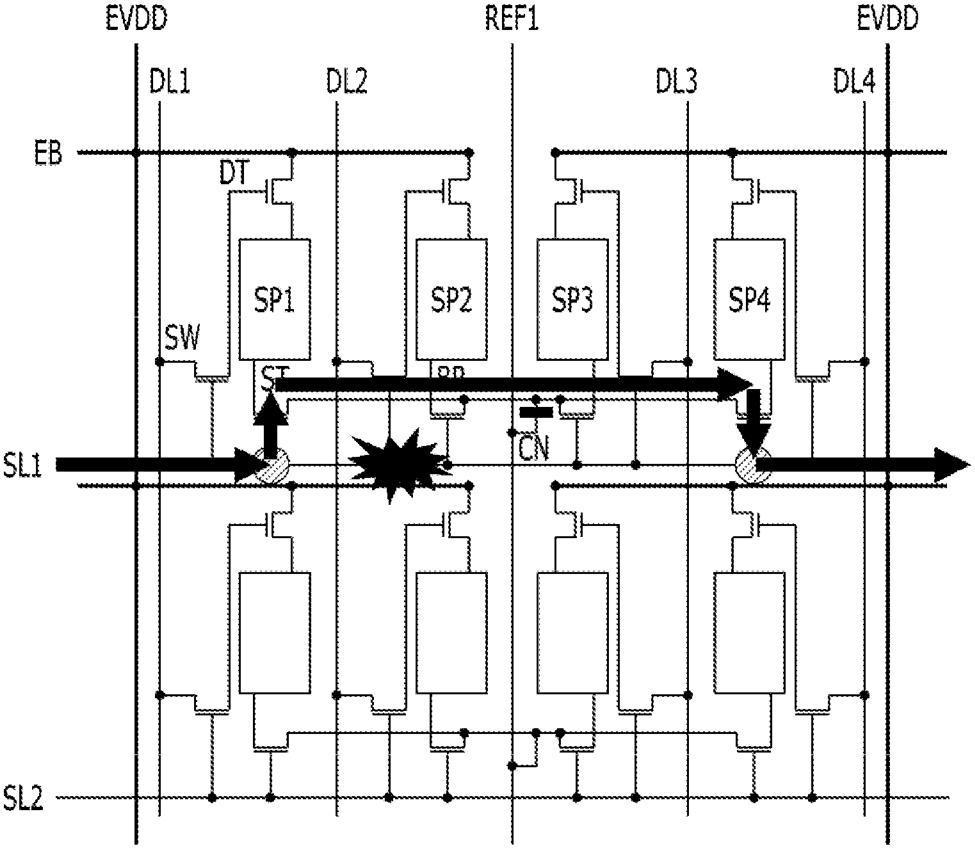
FIG. 6 is a circuit diagram illustrating a bypass signal path formed in a first scan line in using repair according to an aspect.

FIG. 5 is a circuit diagram for schematically describing a repair structure and method according to an aspect of the present disclosure, and FIG. 6 is a circuit diagram illustrating a bypass signal path formed in a first scan line in using repair according to an aspect.

As illustrated in FIG. 5, a first scan line SL1 and a second scan line SL2 may be formed based on a gate metal layer used in a thin film process. However, while the thin film process is being performed, a defect where a portion of a scan line is cut by various causes may occur. When the portion of the scan line is cut, it may be impossible to transfer a scan signal after a cut point, and due to this, a display defect of a display panel may occur. Accordingly, in manufacturing the display panel, a repair structure and a repair method for repairing the display panel may be needed.

A repair structure and a repair method according to an aspect may be implemented based on a first reference branch line BR and a first reference connection line CN. Hereinafter, in describing the repair structure and the repair method according to an aspect, a gate open defect where a portion of a first scan line SL1 passing through a second subpixel SP2 is cut will be described for example.

When the portion of the first scan line SL1 passing through the second subpixel SP2 is cut (or disconnected), a welding process may be performed to electrically connect the first scan line SL1 with the first reference branch line BR. The welding process may be performed at a periphery of a sensing transistor ST of a fourth subpixel SP4 and a periphery of a sensing transistor ST of a first subpixel SP1, which are capable of an electrical connection between the first scan line SL1 and the first reference branch line BR.

An aspect may weld two or more portions such as the periphery of the sensing transistor ST of the first subpixel SP1 and the periphery of the sensing transistor ST of the fourth subpixel SP4, and thus, may solve a problem where a portion of the first scan line SL1 passing through the second subpixel SP2 is cut. That is, an aspect may weld a region apart from an opening region, and thus, may enhance the opening region and may reduce or minimize the number of welding operations, thereby reducing a time taken in a repair process.

Subsequently, a line cutting process may be performed to electrically disconnect the first reference line REF1 from the first reference branch line BR. The line cutting process may be performed on a first reference connection line CN provided for electrically connecting the first reference line REF1 with the first reference branch line BR.

When a welding process and a line cutting process are completed, a first subpixel SP1, a second subpixel SP2, a third subpixel SP3, and a fourth subpixel SP4 connected with the first scan line SL1 may have a state (an electrically disconnected state) which is not connected with the first reference line REF1. On the other hand, as the first scan line SL1 is newly and electrically connected with the first reference branch line BR, anew signal path may be formed as in FIG. 6. The new signal path may be defined as a bypass signal path (a bypass signal line) for repairing the cutting of a partial portion of the first scan line SL1.

Hereinafter, a portion associated with a repair structure and a repair method according to an aspect will be described in more detail.

Figure 7:
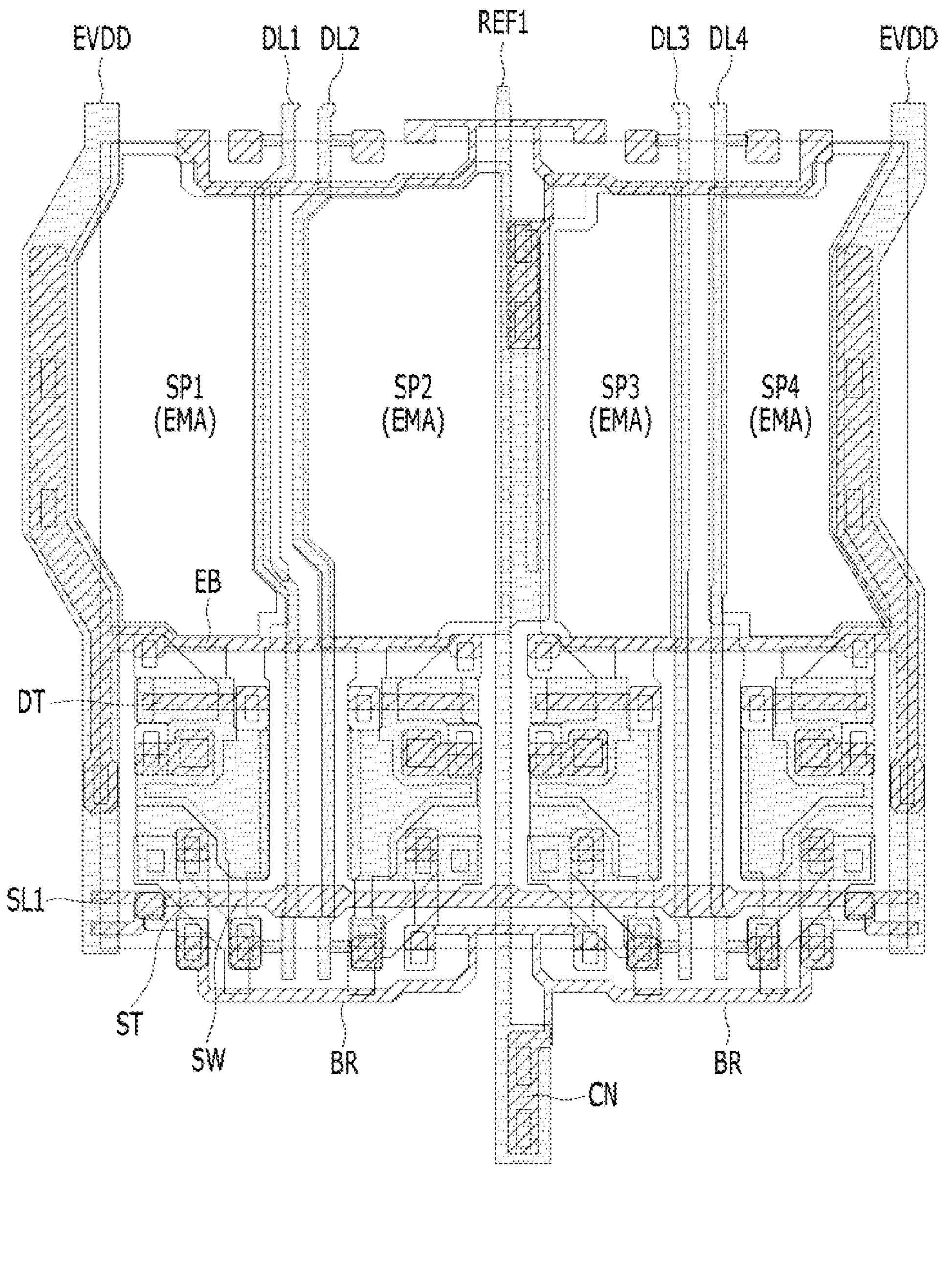
FIG. 7 is a plan view illustrating a pixel according to an aspect of the present disclosure.
Figure 8:
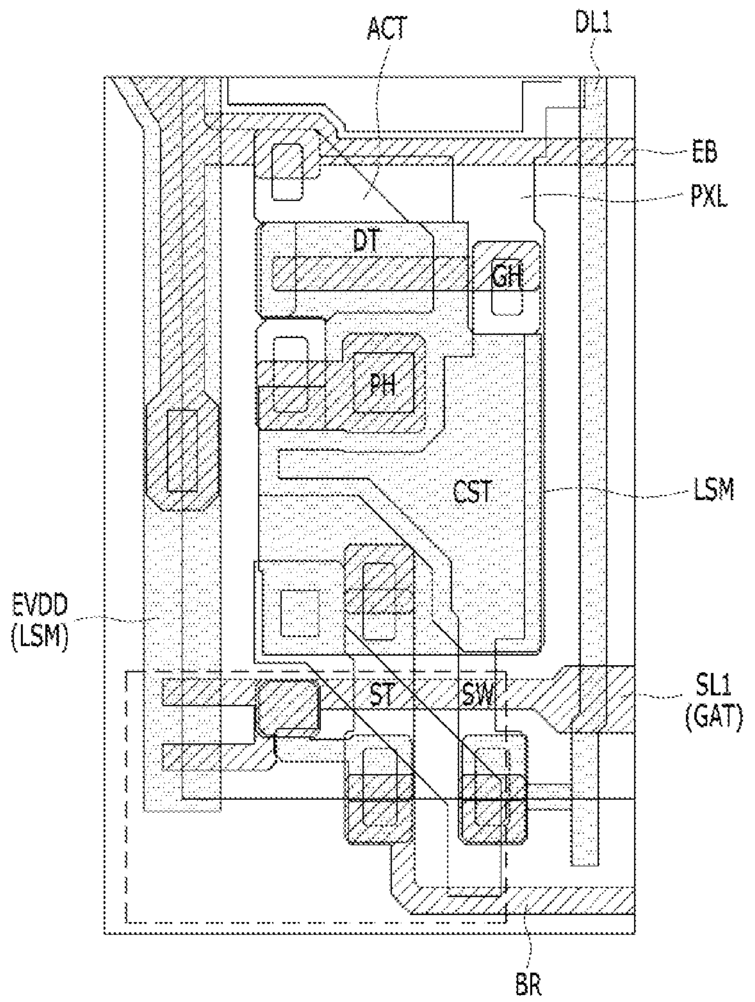
FIG. 8 is a plan view illustrating in more detail a portion of a first subpixel illustrated in FIG. 7.
Figure 9:
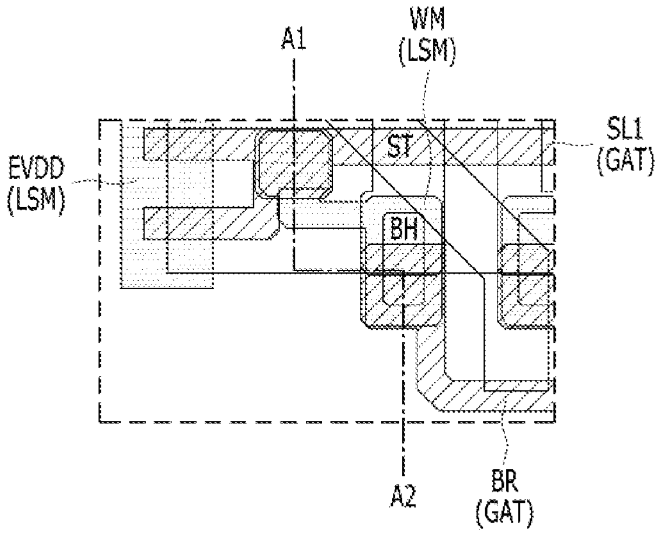
FIG. 9 is an enlarged view illustrating in more detail a portion of FIG. 8.
Figure 10:
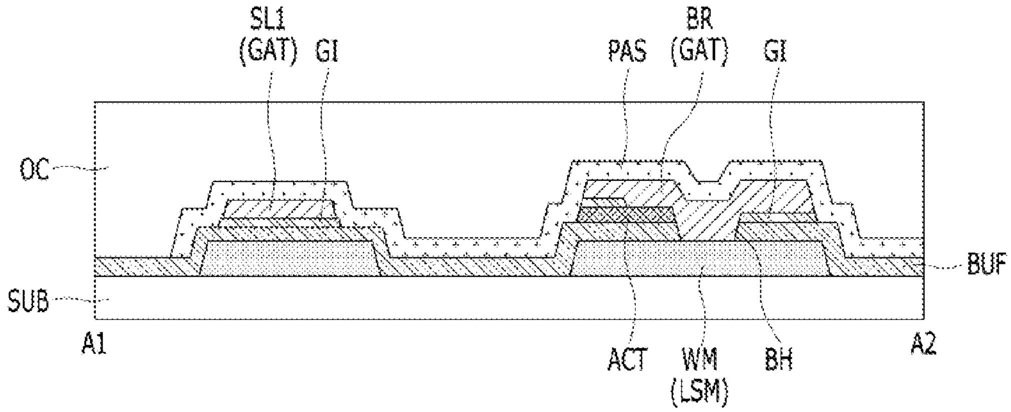
FIG. 10 is a cross-sectional view of region A1-A2 illustrated in FIG. 9.
Figure 11:
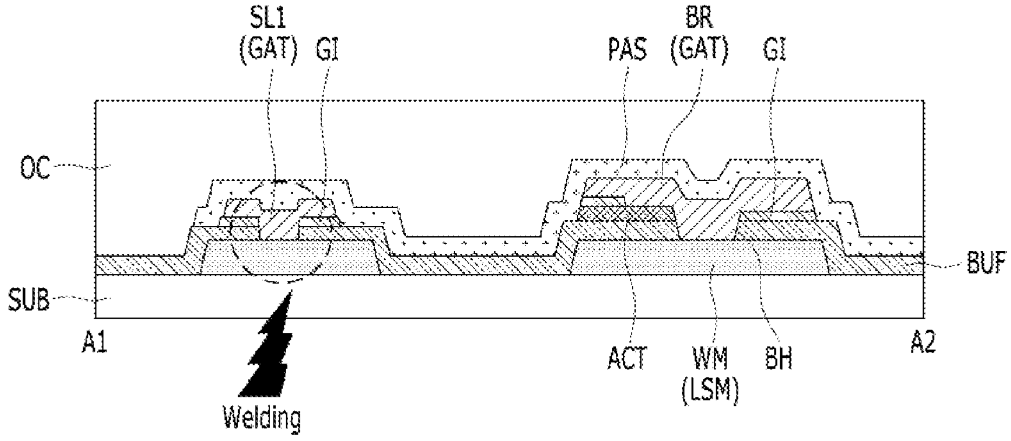
FIGS. 11 to 14 are diagrams for describing a repair method according to an aspect.

FIG. 7 is a plan view illustrating a pixel according to an aspect of the present disclosure, FIG. 8 is a plan view illustrating in more detail a portion of a first subpixel illustrated in FIG. 7, FIG. 9 is an enlarged view illustrating in more detail a portion of FIG. 8, FIG. 10 is a cross-sectional view of a region A1-A2 illustrated in FIG. 9, and FIGS. 11 to 14 are diagrams for describing a repair method according to an aspect.

As illustrated in FIG. 7, a first subpixel SP1, a second subpixel SP2, a third subpixel SP3, and a fourth subpixel SP4 may be defined by two first power lines EVDD, four data lines DL1 to DL4, one first reference line REF1 arranged in a vertical direction (a first direction), four data lines DL1 to DL4, one first reference line REF1, and one first scan line SL1 arranged in a horizontal direction (a second direction).

Example embodiments of the disclosure are not limited thereto, and more or less subpixels may be defined. In addition, the first and second directions may be other directions such as an inclined direction, etc. as long as they are intersected with each other. Further, there may be power line, data line, scan line and reference line disposed in other directions and/or of other numbers to define subpixels.

Each of the first subpixel SP1, the second subpixel SP2, the third subpixel SP3, and the fourth subpixel SP4 may include an emission region EMA. The emission region EMA may be a region which emits light and may include an organic light emitting diode.

Furthermore, in FIG. 7, a structure where a first power line EVDD, a first data line DL1, and a second data line DL2 do not have linearity (are not straight) due to different sizes of emission regions EMA and partially protrude to a left side at a periphery of the emission region EMA is described for example, but the present disclosure is not limited thereto. That is, the first subpixel SP1, the second subpixel SP2, the third subpixel SP3, and the fourth subpixel SP4 may include emission regions EMA having different sizes, and thus, some lines may have nonlinearity for example, but the present disclosure is not limited thereto.

A circuit region (or a non-emission region) may be disposed under the emission region EMA (in the plane view). A driving transistor DT, a capacitor CST, a switching transistor SW, and a sensing transistor ST may be provided in the circuit region. Also, a first power branch line EB arranged in a horizontal direction, a first scan line SL1, a first reference branch line BR and a first reference connection line CN arranged in a vertical direction may be provided in the circuit region.

Furthermore, the first reference branch line BR may have an electrical contact point with the sensing transistor ST included in the first subpixel SP1, the second subpixel SP2, the third subpixel SP3, and the fourth subpixel SP4. Accordingly, the first reference branch line BR may not only be arranged in the horizontal direction and may include a region arranged in the vertical direction in a region adjacent to the sensing transistor ST. Also, the first reference branch line BR may include a region arranged in a diagonal direction (inclined direction) in a partial section, based on the arrangement of a peripheral electrode or a line.

As illustrated in FIGS. 8 to 10, the driving transistor DT, the capacitor CST, the switching transistor SW, the sensing transistor ST, the first power branch line EB, the first scan line SL1, and the first reference branch line BR provided in the circuit region may be formed based on a lower metal layer LSM, a semiconductor layer ACT, a gate metal layer GAT, and a pixel electrode layer PXL. Also, an electrode and an electrode, a layer and a layer, a line or line or any two or more of an electrode, a layer or a line provided in the circuit region may be electrically connected with each other through a hole structure including but not limited to contact holes GH, PH, and BH.

GH may be defined as a contact hole for electrically connecting the gate metal layer GAT with the semiconductor layer ACT, PH may be defined as a contact hole for electrically connecting the gate metal layer GAT with the pixel electrode layer PXL, and BH may be defined as a contact hole for electrically connecting the lower metal layer LSM with the gate metal layer GAT.

A dummy metal layer WM may be disposed in the circuit region of a substrate SUB. The dummy metal layer WM may be selected as the same layer and the same material as the first power line EVDD and the lower metal layer LSM. For example, the dummy metal layer WM may be formed of a single layer or multi-layer made of any one of molybdenum (Mo), aluminum (Al), chromium (Cr), gold (Au), titanium (Ti), nickel (Ni), neodymium (Nd) and copper (Cu), or their alloy. The lower metal layer LSM may be formed for preventing external light from penetrating into the semiconductor layer ACT of the driving transistor DT and may be a layer which is formed directly on the substrate SUB to electrically connect an electrode with an electrode or a line with an electrode.

A buffer layer BUF covering the dummy metal layer WM may be disposed on the substrate SUB. An example where the buffer layer BUF is formed of a single layer may be described, but the buffer layer BUF may be formed of a multilayer. The buffer layer BUF may be formed of an inorganic material, such as silicon oxide SiOx or silicon nitride SiNx. For example, inorganic films in multiple layers may be formed by alternately stacking one or more silicon oxide (SiOx) films, one or more silicon nitride (SiNx) films, and one or more amorphous silicon (a-Si), but the present disclosure is not limited thereto.

The buffer layer BUF may be disposed on the substrate, on which the elements are formed, to cover the elements. The buffer layer BUF may serve to protect the thin film transistor formed by a subsequent process from impurities such as alkali ion leaking from the light-shielding layer LS or the substrate.

The buffer layer BUF may include a region where the semiconductor layer ACT is not provided and a region where the semiconductor layer ACT is provided. The region where the semiconductor layer ACT is not provided may be a region where the first scan line SL1 overlaps with one end of the dummy metal layer WM, and the region where the semiconductor layer ACT is provided may be a region where a first electrode of the sensing transistor ST overlaps with the other end of the dummy metal layer WM. According to an example embodiment of the present disclosure, the semiconductor layer ACT may be used as an electrode of the driving transistor DT. For example, the electrode of the driving transistor DT may comprise a portion including a semiconductor layer ACT.

A gate insulation layer GI may be disposed on the buffer layer BUF and the semiconductor layer ACT of the sensing transistor ST. The gate insulating layer GI may be formed of an inorganic insulating material such as silicon oxide SiOx or silicon nitride SiNx. In addition, the gate insulating layer GI may be composed of a single layer or multilayers, but is not limited thereto. The first scan line SL1 and the first reference branch line BR may be disposed on the gate insulation layer GI. The first scan line SL1 and the first reference branch line BR may be formed by the gate metal layer GAT, but may be separated from each other through a pattern process and may have an electrically disconnected state.

A passivation layer PAS covering the first scan line SL1 and the first reference branch line BR each including the gate metal layer GAT may be disposed on the buffer layer BUF. The passivation layer PAS may be formed of an organic insulating material, such as photo acryl, benzocyclobutene, but is not limited thereto, the passivation layer PAS may be constituted by inorganic insulating material, such as a single layer made of a silicon oxide (SiOx) film, a silicon nitride (SiNx) film, or a silicon oxynitride (SiOxNy) film or a multilayer film thereof, etc. An overcoat layer (or an organic layer) OC may be disposed on the passivation layer PAS.

One end of the dummy metal layer WM may overlap with the first scan line SL1, but the one end of the dummy metal layer WM and the first scan line SL1 may have an electrically disconnected state. On the other hand, the other end of the dummy metal layer WM may overlap with the first reference branch line BR, but the other end of the dummy metal layer WM and the first reference branch line BR may have an electrically connected state. The other end of the dummy metal layer WM may have a state where the other end thereof is electrically connected with a semiconductor layer ACT, which is a first electrode of the sensing transistor ST, by the first reference branch line BR.

The dummy metal layer WM may be disposed at a periphery of the sensing transistor ST and may be defined as a metal layer which is used in a welding process. Therefore, in a case where the welding process is performed through one end of the dummy metal layer WM, the buffer layer BUF, the gate insulation layer GI, and the first scan line SL1 may be melted as in FIG. 11. Also, the first scan line SL1 and the first reference branch line BR may have an electrically connected state based on the dummy metal layer WM.

Furthermore, as described above with reference to FIG. 5, the dummy metal layer WM may be provided in the first subpixel SP1, and moreover, may also be provided in the fourth subpixel SP4 which is symmetrical with first subpixel SP1. To provide an additional description, the dummy metal layer WM may be disposed between a one-side first power line EVDD and the sensing transistor ST included in the first subpixel SP1 (or a region adjacent to the one-side first power line) and between an other-side first power line EVDD and the sensing transistor ST included in the fourth subpixel SP4 (or a region adjacent to the other-side first power line). However, the arrangements of the dummy metal layer according to the example embodiments of the present disclosure are not limited to the above.

Therefore, as described above with reference to FIG. 5, a welding process may be identically performed on the dummy metal layer WM disposed at a periphery of the sensing transistor ST of the fourth subpixel SP4, in addition to the dummy metal layer WM disposed at a periphery of the sensing transistor ST of the first subpixel SP1.

Figure 12:
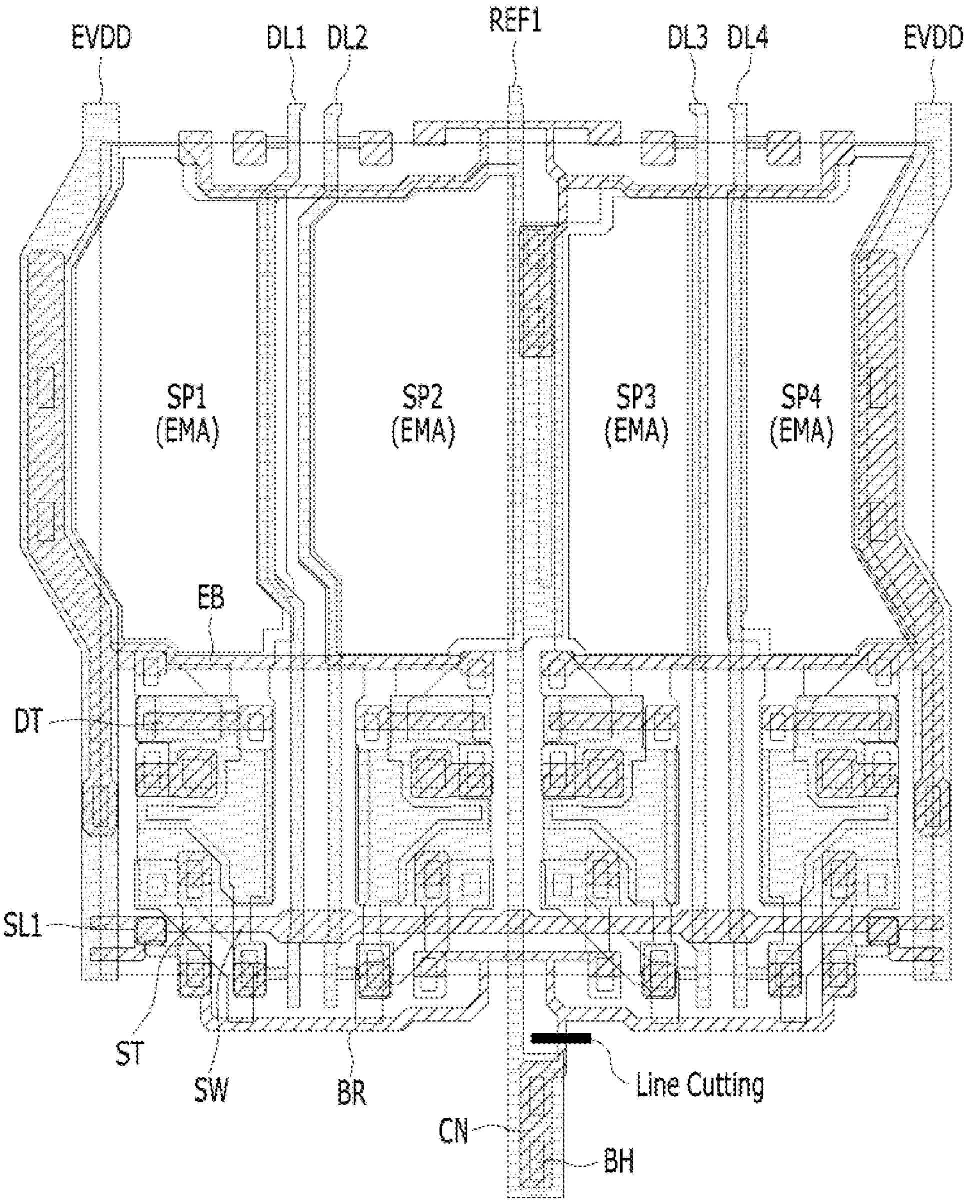
Figure 13:
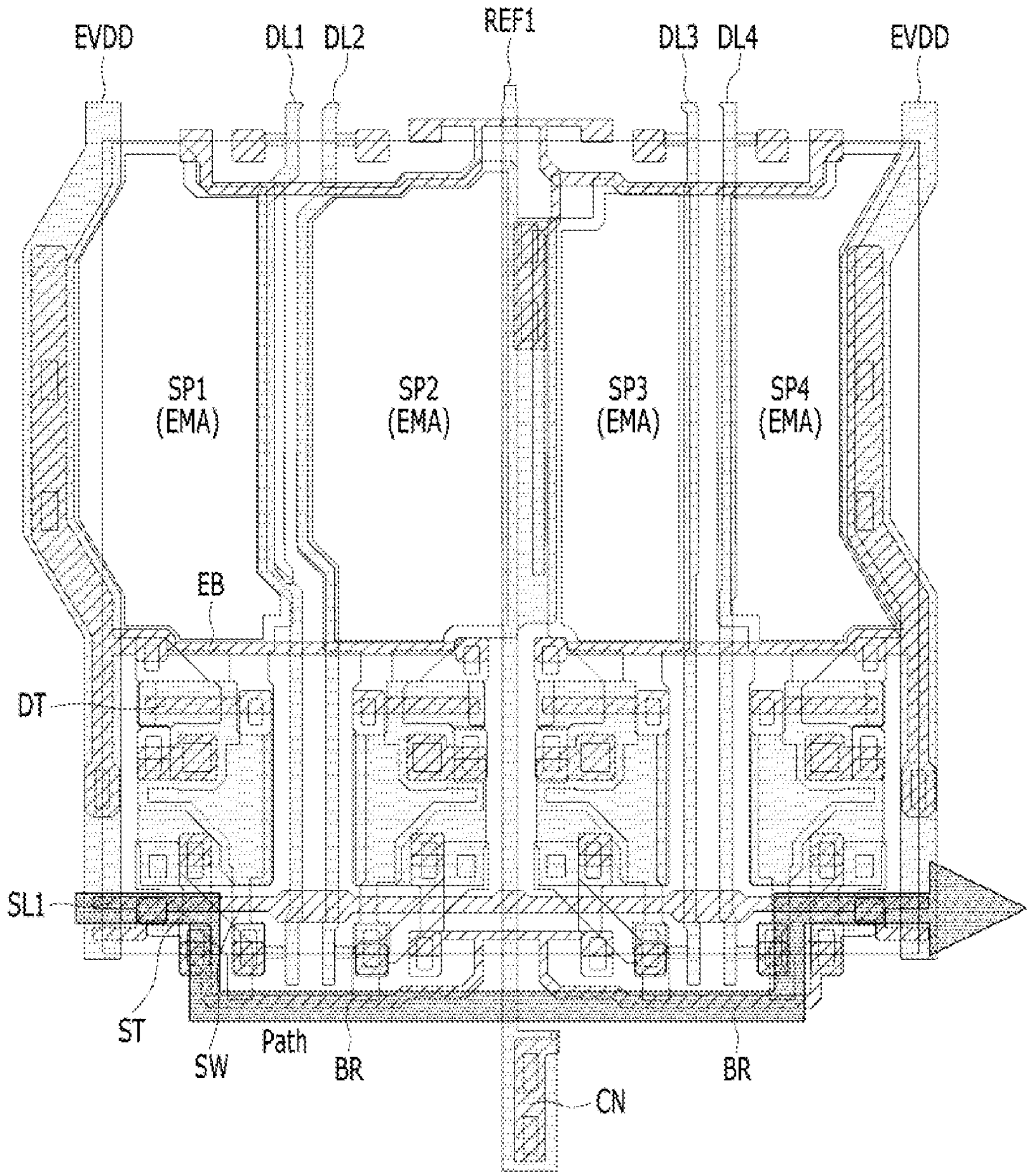
Figure 14:
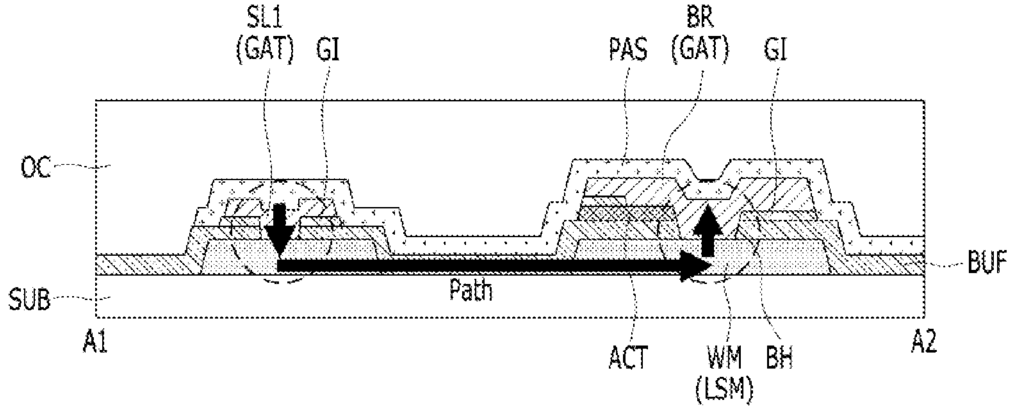

After the welding process is performed, in a case where a line cutting process is performed on a first reference connection line CN which does not overlap with the first reference line REF1, as in FIG. 12, the first reference line REF1 may be electrically and completely disconnected from the first reference branch line BR. As a result, as in FIGS. 13 and 14, the first scan line SL1 may be newly and electrically connected with the first reference branch line BR, and a bypass signal path (a bypass signal line) (Path) for repairing the cutting of a partial section of the first scan line SL1 may be provided.

Figure 15:
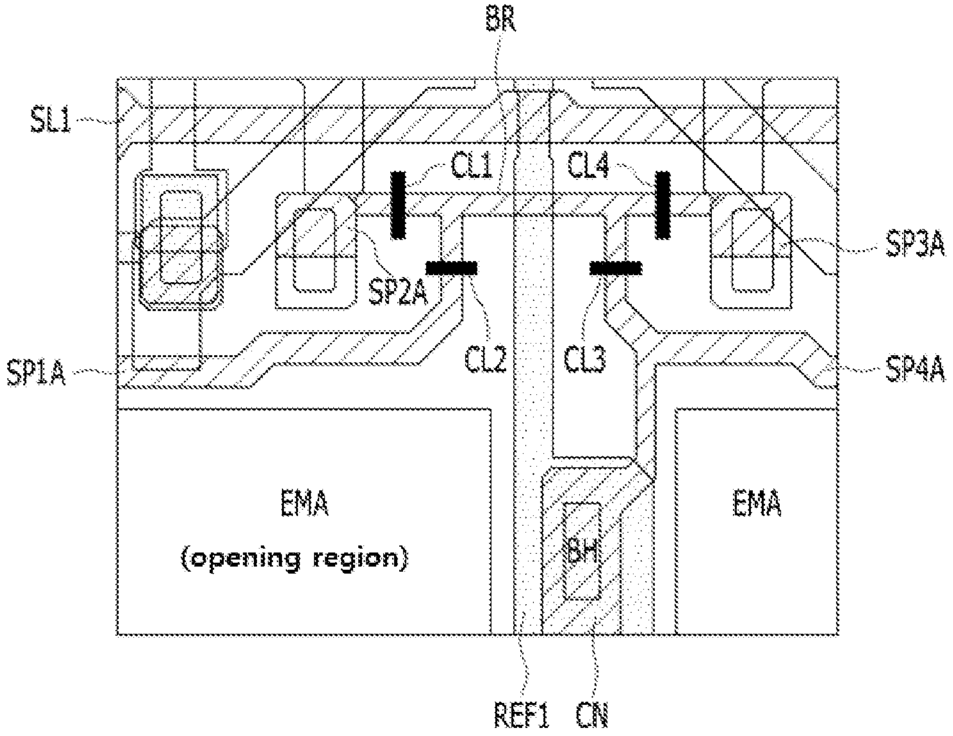
FIGS. 15 and 16 are diagrams for describing a structure of a first reference branch line and a repair margin based thereon, according to an aspect of the present disclosure.
Figure 16:
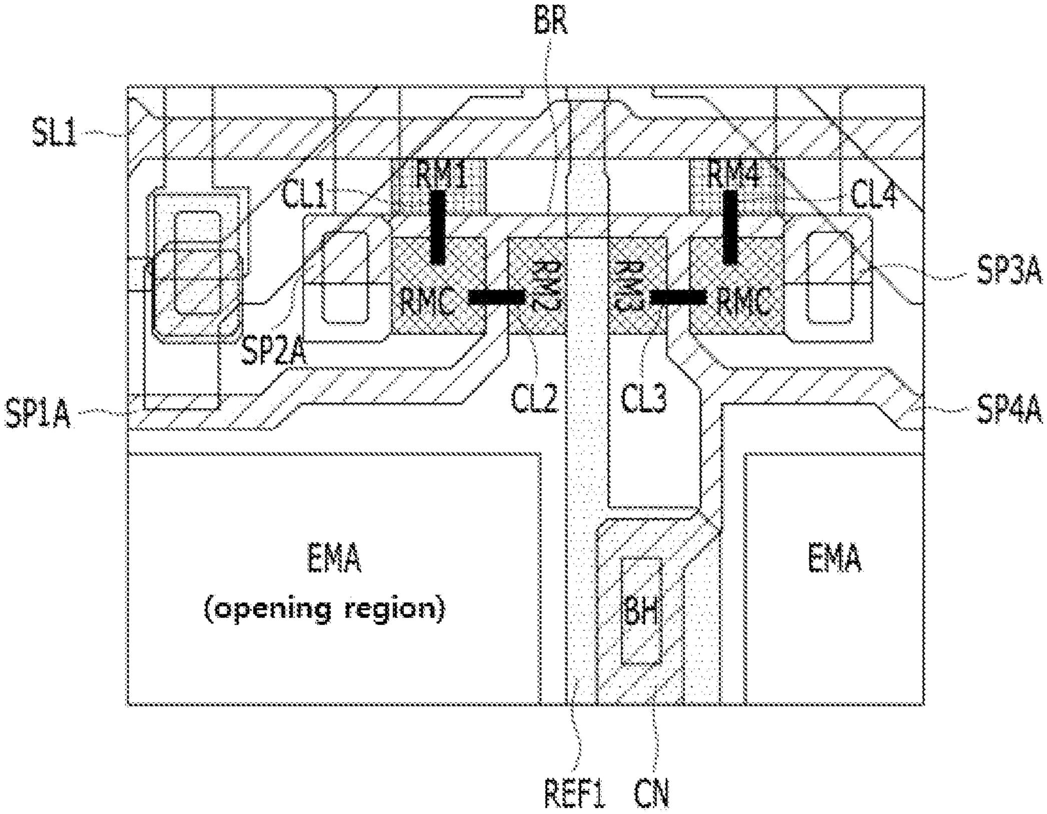

FIGS. 15 and 16 are diagrams for describing a structure of a first reference branch line and a repair margin based thereon, according to an aspect of the present disclosure.

As illustrated in FIGS. 7, 15, and 16, a first reference branch line BR may be electrically connected with a first reference line REF1, based on a first reference connection line CN. The first reference branch line BR may include a first branch portion SP1A connected with a first subpixel SP1, a second branch portion SP2A connected with a second subpixel SP2, a third branch portion SP3A connected with a third subpixel SP3, and a fourth branch portion SP4A connected with a fourth subpixel SP4.

The second branch portion SP2A and the third branch portion SP3A may be arranged in a horizontal direction, and an end thereof may have an area which is greater than a different region, to form an electrical contact point with a sensing transistor ST. The second branch portion SP2A and the third branch portion SP3A may be connected with a sensing transistor ST included in the second subpixel SP2 and the third subpixel SP3 adjacent to each other, and thus, may have a line length which is shorter than the first branch portion SP1A and the fourth branch portion SP4A.

The first branch portion SP1A may be disposed to extend in a vertical direction from a center region of the second branch portion SP2A and may be wired in a horizontal direction up to a region where the first subpixel SP1 is provided. The fourth branch portion SP4A may be disposed to extend in a vertical direction from a center region of the third branch portion SP3A and may be wired in a horizontal direction up to a region where the fourth subpixel SP4 is provided. The first and second branch portions SP1A and SP2A and the third and fourth branch portions SP3A and SP4A may be formed to be horizontally symmetrical with respect to the first reference line REF1.

The first reference branch line BR according to an aspect may include a total of four branch portions SP1A to SP4A and may configure four sub cutting lines CL1 to CL4 in a horizontally symmetrical shape with respect to the first reference line REF1. The four sub cutting lines CL1 to CL4 may be used in performing individual repair on four subpixels SP1 to SP4.

The first branch portion SP1A may have a first repair margin RM1 corresponding to a first sub cutting line CL1 between the first branch portion SP1A and a region through which a first scan line SL1 passes. The second branch portion SP2A may have a second repair margin RM2 corresponding to a second sub cutting line CL2 between the second branch portion SP2A and a region through which the first reference line REF1 passes. Also, the first branch portion SP1A and the second branch portion SP2A may have a sharing margin RMC by the first sub cutting line CL1 and the second sub cutting line CL2.

The third branch portion SP3A may have a third repair margin RM3 corresponding to a third sub cutting line CL3 between the third branch portion SP3A and a region through which the first reference line REF1 passes. The fourth branch portion SP4A may have a fourth repair margin RM4 corresponding to a fourth sub cutting line CL4 between the fourth branch portion SP4A and a region through which the first scan line SL1 passes. Also, the third branch portion SP3A and the fourth branch portion SP4A may have a sharing margin RMC by the third sub cutting line CL3 and the fourth sub cutting line CL4.

A sharing margin RMC, formed in a region where the branch portions SP1A to SP4A form a 'L'-shape, may denote a margin which may be occupied and shared in common in performing a cutting process through the first sub cutting line CL1 and the second sub cutting line CL2 or the third sub cutting line CL3 and the fourth sub cutting line CL4.

As described above, when the branch portions SP1A to SP4A have the sharing margin RMC, a problem may be solved where a repair margin extends to a different region or occupies a wide area. As a result, as the repair margin is set, an opening region (or an emission region) of subpixels vertically adjacent to each other may not be reduced, and a predetermined opening region may be secured (maintained).

Furthermore, an example is described where a region where the first reference line REF1 overlaps with the first reference connection line CN includes a region which protrudes to a right side of the drawing as a contact hole BH is formed for implementing an electrical connection therebetween, but it should be construed that this is one aspect.

Figure 17:
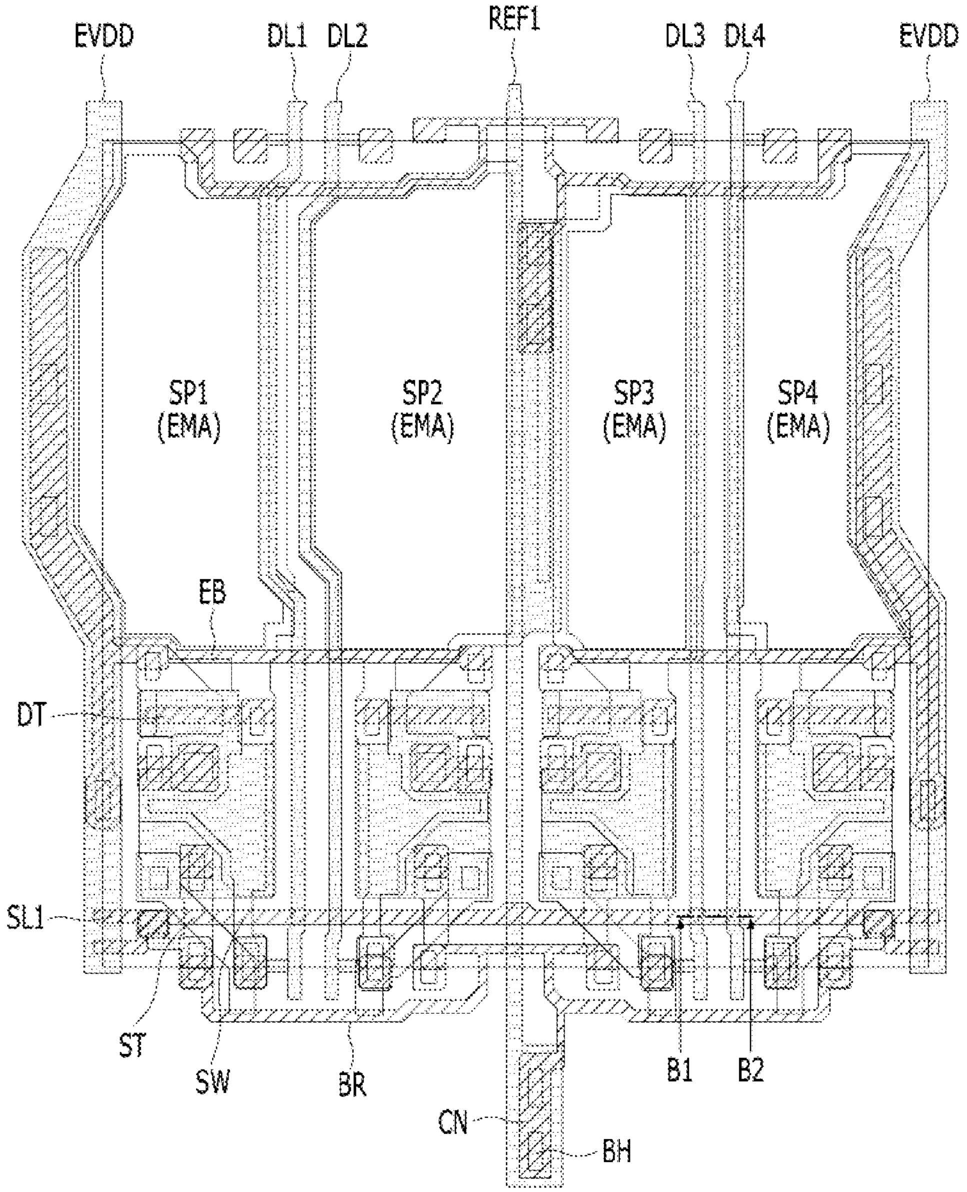
FIGS. 17 and 18 are diagrams for describing an arrangement structure of a scan line according to another aspect of the present disclosure.
Figure 18:
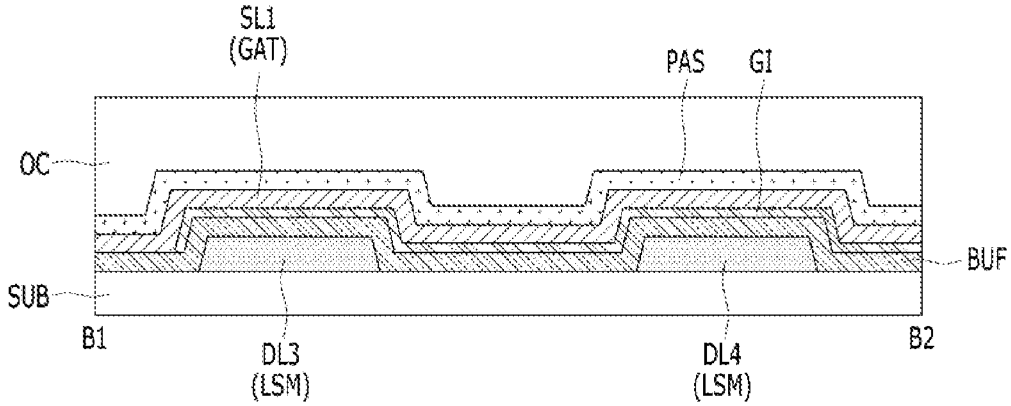

FIGS. 17 and 18 are diagrams for describing an arrangement structure of a scan line according to another aspect of the present disclosure.

As illustrated in FIGS. 17 and 18, a first scan line SL1 may be disposed on a buffer layer BUF, covering data lines DL3 and DL4 disposed on a substrate SUB, and a gate insulation layer GI on the buffer layer BUF. Also, the first scan line SL1 may be protected by a passivation layer PAS and an overcoat layer OC.

According to an aspect, scan lines may be arranged in a '1'-shape (or 'I'-shape) to all have the same line width, except a branch region intersecting with a first power line EVDD. This may be known with reference to the first scan line SL1.

As described above, the reason that half (almost all sections) of scan lines are arranged in a '1'-shape (or 'I'-shape) may be because repair may be performed based on the first reference branch line BR when a scan line is disconnected or short circuit occurs between the gate metal layer GAT for forming a scan line and a different metal layer. Furthermore, in a case where half (almost all sections) of scan lines are arranged in a '1'-shape (or 'I'-shape), a density of lines or electrodes may more increase, thereby increasing an opening region Hereinabove, the present disclosure may secure an opening region by welding a region apart from the opening region when short circuit occurs between a gate metal layer for forming a scan line and a different metal layer or the scan line is cut and may minimize the number of welding operations, thereby reducing a time taken in a repair process. Also, the present disclosure may arrange half (almost all sections) of scan lines in a '1'-shape (or 'I'-shape), and thus, may more increase a density of lines or electrodes, thereby increasing an opening region. Also, the present disclosure may repair the cutting of a scan line, based on a point repair method which is more simplified than the related art.

The effects according to the present disclosure are not limited to the above examples, and other various effects may be included in the specification.

While the present disclosure has been particularly shown and described with reference to exemplary aspects thereof, it will be understood by those of ordinary skill in the art that various changes in form and details may be made therein without departing from the spirit and scope of the present disclosure as defined by the following claims. Consequently, the scope of the present disclosure is defined by the accompanying claims, and it is intended that all variations or modifications derived from the meaning, scope, and equivalent concept of the claims fall within the scope of the present disclosure.

What is claimed is:

1. A light emitting display apparatus comprising:
a plurality of subpixels provided on a substrate;
a reference line arranged in a first direction on the substrate;
a scan line arranged in a second direction intersecting the first direction on the substrate;
a reference branch line connected with the reference line and partly arranged in the second direction; and
a dummy metal layer disposed on the substrate and including a region overlapping with the scan line and a region overlapping with the reference branch line,
wherein, when the dummy metal layer is electrically connected with the scan line, and the reference line and the reference branch line are electrically disconnected from each other, the reference branch line functions as a bypass signal line transferring, through a bypass path, a scan signal applied through the scan line, and
wherein the reference branch line is electrically connected with the reference line by a reference connection line arranged in the first direction, and when the reference branch line functions as the bypass signal line, the reference connection line is electrically disconnected from the reference line by a line cutting process.

2. The light emitting display apparatus of claim 1, wherein the dummy metal layer is selected as a lower metal layer disposed directly on the substrate, and
the scan line and the reference branch line are selected as a gate metal layer disposed above the dummy metal layer.

3. The light emitting display apparatus of claim 1, wherein the dummy metal layer is electrically separated from the scan line and electrically connected to the reference branch line.

4. The light emitting display apparatus of claim 1, wherein the dummy metal layer is disposed in a region adjacent to a power line.

5. The light emitting display apparatus of claim 1, wherein the scan line is disposed in a '1'-shape (or 'I'-shape), except for a region intersecting a power line.

6. The light emitting display apparatus of claim 1, wherein the reference branch line comprises:
a first branch portion connected with a first subpixel of the plurality of subpixels;
a second branch portion connected with a second subpixel adjacent to the first subpixel of the plurality of subpixels;
a third branch portion connected with a third subpixel adjacent to the second subpixel of the plurality of subpixels; and
a fourth branch portion connected with a fourth subpixel adjacent to the third subpixel of the plurality of subpixels.

7. The light emitting display apparatus of claim 6, wherein the second branch portion and the third branch portion are arranged in the first direction,
the first branch portion is disposed to extend in a vertical direction from a center region of the second branch portion and is wired in a horizontal direction up to a region where the first subpixel is provided, and
the fourth branch portion is disposed to extend in a vertical direction from a center region of the third branch portion and is wired in a horizontal direction up to a region where the fourth subpixel is provided.

8. The light emitting display apparatus of claim 7, wherein the first and second branch portions and the third and fourth branch portions are horizontally symmetrical with respect to the reference line.

9. The light emitting display apparatus of claim 7, wherein each of the second branch portion and the third branch portion has a line length which is shorter than the first branch portion and the fourth branch portion.

10. The light emitting display apparatus of claim 7, wherein the first branch portion and the second branch portion have a sharing margin by a first sub cutting line for performing repair in the first subpixel and a second sub cutting line for performing repair in the second subpixel, and
the third branch portion and the fourth branch portion have a sharing margin by a third sub cutting line for performing repair in the third subpixel and a fourth sub cutting line for performing repair in the fourth subpixel.

11. A method of repairing a light emitting display apparatus according to claim 1, the method comprising:
performing welding at a periphery of a one side of a subpixel at a disconnection section of the scan line and at a periphery of another side of the subpixel apart from the one side of the subpixel so that one side of the scan line is electrically connected with one side of the reference branch line and another side of the scan line is electrically connected with another side of the reference branch line; and
cutting the reference line and the reference branch line to electrically disconnect with each other.

12. The method of claim 11, wherein the welding is performed in the dummy metal layer in the one-side of the subpixel and the other-side of the subpixel, the dummy metal layer including a region overlapping the scan line and a region overlapping the reference branch line.

* * * * *